United States Patent
Seibold et al.

(10) Patent No.: US 10,214,126 B2
(45) Date of Patent: Feb. 26, 2019

(54) SEAT BACK OF HYBRID CONSTRUCTION AND A PROCESS FOR FORMING A SEAT BACK OF HYBRID CONSTRUCTION

(71) Applicant: Johnson Controls Technology Company, Plymouth, MI (US)

(72) Inventors: Kurt Seibold, Farmington Hills, MI (US); Ingo Kienke, Burscheid (DE)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 98 days.

(21) Appl. No.: 15/302,797

(22) PCT Filed: May 22, 2015

(86) PCT No.: PCT/US2015/032157
§ 371 (c)(1),
(2) Date: Oct. 7, 2016

(87) PCT Pub. No.: WO2015/183730
PCT Pub. Date: Dec. 3, 2015

(65) Prior Publication Data
US 2017/0028891 A1   Feb. 2, 2017

Related U.S. Application Data

(60) Provisional application No. 62/003,257, filed on May 27, 2014.

(51) Int. Cl.
*B60N 2/68* (2006.01)
*B29C 45/14* (2006.01)
*B60N 2/809* (2018.01)
*B29K 621/00* (2006.01)
*B29K 675/00* (2006.01)
*B29L 31/30* (2006.01)

(52) U.S. Cl.
CPC .......... *B60N 2/68* (2013.01); *B29C 45/14475* (2013.01); *B60N 2/686* (2013.01); *B60N 2/809* (2018.02); *B29K 2621/003* (2013.01); *B29K 2675/00* (2013.01); *B29L 2031/30* (2013.01)

(58) Field of Classification Search
None
See application file for complete search history.

(56) References Cited

U.S. PATENT DOCUMENTS

| | | | | |
|---|---|---|---|---|
| 4,466,663 A | * | 8/1984 | Oishi | B60N 2/812 297/410 |
| 4,619,483 A | * | 10/1986 | Dickey | A47C 7/383 297/394 |
| 4,688,852 A | * | 8/1987 | Arai | B60N 2/818 297/410 |
| 5,879,055 A | * | 3/1999 | Dishner | B60N 2/0715 297/452.38 |
| 6,213,557 B1 | | 4/2001 | Aebischer et al. | |
| 6,739,673 B2 | | 5/2004 | Gupta et al. | |

(Continued)

FOREIGN PATENT DOCUMENTS

FR   2982207 A1 *   5/2013   ............. B60N 2/686

*Primary Examiner* — David E Allred
(74) *Attorney, Agent, or Firm* — McGlew and Tuttle, P.C.

(57) ABSTRACT

An overmolded seat back structure having a connecting surface for supporting a support panel and a process for forming a seat back structure via an overmolding process.

16 Claims, 19 Drawing Sheets

(56) References Cited

U.S. PATENT DOCUMENTS

| | | | |
|---|---|---|---|
| 8,297,705 B2* | 10/2012 | Brunner | B60N 2/815 |
| | | | 297/410 |
| 9,090,190 B2* | 7/2015 | Yasui | B60N 2/68 |
| 9,718,387 B2* | 8/2017 | Llne | B60N 2/68 |
| 9,724,858 B2* | 8/2017 | Ribaric | B29C 45/14786 |
| 2003/0117003 A1* | 6/2003 | Fourrey | B29C 70/44 |
| | | | 297/452.18 |
| 2005/0023880 A1* | 2/2005 | Fourrey | B29C 45/14631 |
| | | | 297/452.18 |
| 2005/0212342 A1* | 9/2005 | Kain | B60N 2/2851 |
| | | | 297/410 |
| 2011/0316320 A1 | 12/2011 | Kulkarni et al. | |
| 2012/0169103 A1* | 7/2012 | Renault | B60N 2/22 |
| | | | 297/354.12 |
| 2012/0306253 A1 | 12/2012 | Seibold et al. | |
| 2013/0119743 A1* | 5/2013 | Evans | B60N 2/68 |
| | | | 297/452.18 |
| 2013/0181372 A1 | 7/2013 | Fookes et al. | |
| 2013/0320742 A1 | 12/2013 | Murolo et al. | |
| 2014/0015288 A1* | 1/2014 | Tachikawa | B60N 2/3013 |
| | | | 297/61 |
| 2015/0001906 A1* | 1/2015 | Line | B60N 2/66 |
| | | | 297/403 |
| 2016/0347224 A1* | 12/2016 | Line | B60N 2/80 |
| 2017/0291520 A1* | 10/2017 | Line | B29C 43/18 |
| 2017/0368973 A1* | 12/2017 | Seo | B60N 2/682 |
| 2018/0065523 A1* | 3/2018 | Soltner | B60N 2/812 |
| 2018/0126886 A1* | 5/2018 | Line | B60N 2/80 |
| 2018/0186257 A1* | 7/2018 | Kondrad | B60N 2/882 |

* cited by examiner

SEAT BACK OF HYBRID CONSTRUCTION AND A PROCESS FOR FORMING A SEAT BACK OF HYBRID CONSTRUCTION

CROSS REFERENCE TO RELATED APPLICATIONS

This application is a U.S. National Phase Application of International Application PCT/US2015/032157 filed May 22, 2015 and claims the benefit of priority under 35 U.S.C. § 119 and § 120 of U.S. Provisional Application 62/003,257 filed May 27, 2014, the entire contents of which are incorporated herein by reference.

FIELD OF THE INVENTION

The present invention relates to a seat back structure and a process for forming a seat back structure.

BACKGROUND OF THE INVENTION

Conventional seat backs typically use foam, which increases the overall size of the seat backs and provides for a dated look and feel.

SUMMARY OF THE INVENTION

An object of the present invention is to provide a seat back of hybrid construction that is light in weight.

According to the invention, a process comprises forming a mating (connecting) surface for a supporting panel via an overmolding process. The supporting panel may be fixed to the mating surface by bonding, a mechanical means, such as welding or any other suitable means for fixing the supporting panel to the mating surface.

The process may further comprise providing an inverted lower cross member. The inverted lower cross member may define at least a portion of the mating surface.

The process may further comprise providing a first side member, a second side member, a lower cross member and a headrest surface. The process may further comprise assembling the first side member, the second side member, the lower cross member and the headrest surface via the overmolding process to form a seat back structure. The seat back structure may comprise the mating surface.

One or more of the first side member, the second side member, the lower cross member and the headrest surface may be reinforced with overmold via the overmolding process.

The overmolding process may form an overmolded seat back structure. The overmolded seat back structure may comprise a male slide for a headrest. The male slide may be integrally connected with the overmolded seat back structure.

The process may further comprise providing a strap and connecting the strap to the support panel.

The supporting panel may be formed in one piece. The one piece supporting panel may be connected to the overmolded seat back structure.

According to the invention, a process comprises providing a plurality of seat back elements and connecting the plurality of seat back elements via an overmolding process to form a seat back structure. The seat back structure comprises a connecting surface for connecting a support panel.

The plurality of seat back elements may comprise a first lateral member, a second lateral member and a cross member. An overmolded seat back member may be formed via the overmolding process. The first lateral member may be connected to the second lateral member via the overmolded member.

The overmolded seat back member may be formed of a material that is different from a material of the first lateral member, the second lateral member and the cross member.

The cross member may comprise a first cross member portion, a second cross member portion and a third cross member portion. The first cross member portion may be connected to the second cross member portion via the third cross member portion. The first cross member portion and the second cross member portion may extend in a direction of a floor of a vehicle. The first cross member portion, the second cross member portion and the third cross member portion may define an opening facing in a direction of the floor of the vehicle to define an inverted cross member structure.

The plurality of seat back elements may comprise a headrest slide structure. The headrest slide structure may be integrally connected to the overmolded seat back member to form the seat back structure with an integrally connected headrest slide structure. The headrest slide structure may comprise a projection to define a male connection portion for a headrest.

One or more of the first lateral member, the second lateral member, the cross member and the overmolded seat back member may be reinforced with overmolded material via the overmolding process.

The process may further comprise a strap connected to the seat back structure.

The support panel may be a one-piece support panel. The one-piece support panel may be connected to the seat back structure.

According to the invention, a seat comprises an overmolded seat back structure. The overmolded seat back structure comprises an interface for supporting a support panel. The interface may be an interfacing surface or a connecting (mating) surface for supporting the support panel.

The overmolded seat back structure may comprise a first member, a second member, an overmolded member and a cross member. The first member may be connected to the second member via the overmolded member. The first member be provided on one side of the seat back structure and the second member may be provided on another side of the seat back structure to provide two lateral (side) members.

The overmolded seat back structure may comprise a slide element. The slide element may be integrally connected to the overmolded member to define a single, one-piece seat back structure with an integrally connected slide for a headrest. The slide element may comprise a male slide surface for connection with the headrest.

Overmolded material may engage one or more of the slide element, the first lateral member, the second lateral member, the overmolded member and the cross member to define one or more overmolded reinforced seat back parts.

The seat may further comprise a strap connected to the overmolded seat back structure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
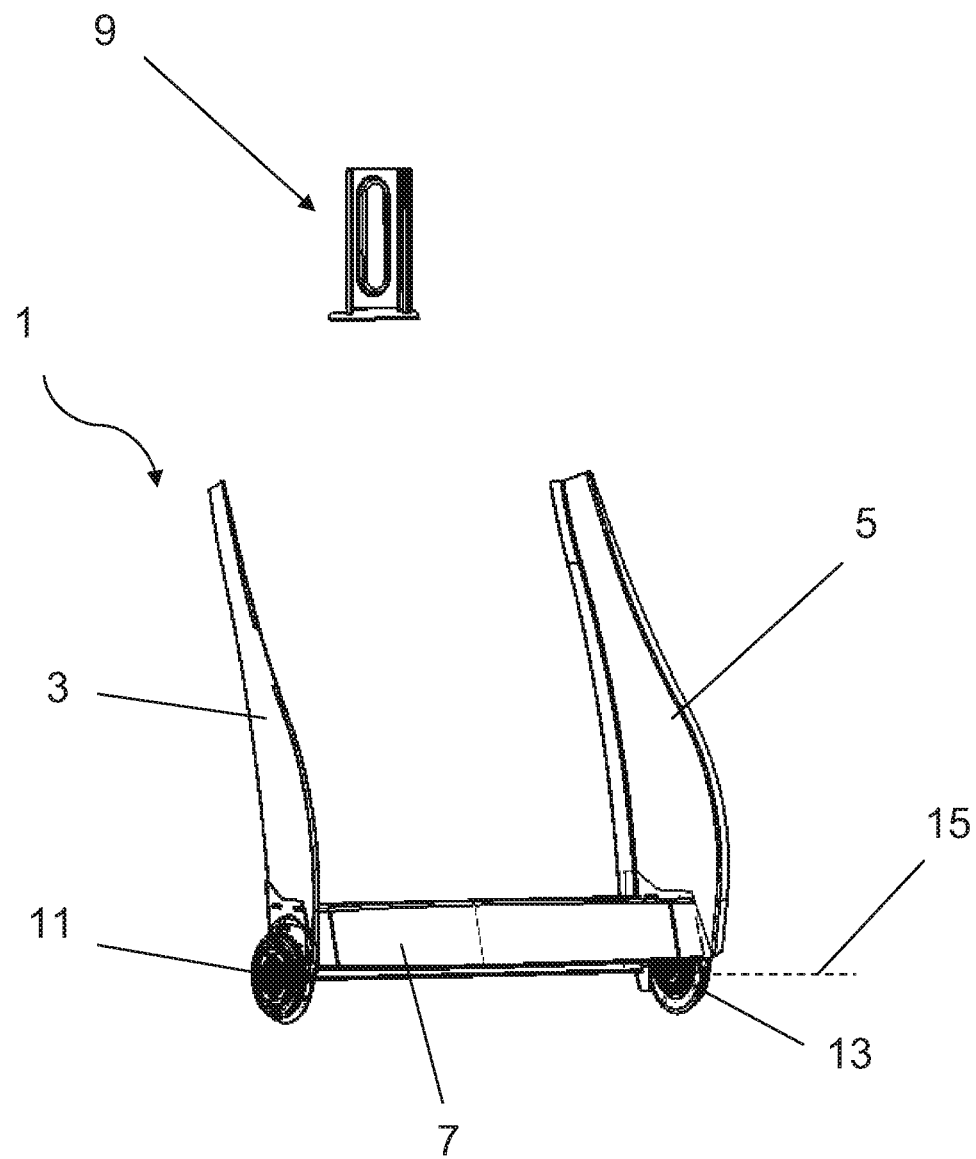
FIG. 1 is a perspective view of a seat back structure before an overmolding process takes place.

Referring to the drawings in particular, FIG. 1 is a perspective view of components of a seat back structure 1 before an overmolding process takes place. The seat back structure 1 includes a first lateral (side) member 3, a second lateral (side) member 5, a cross member 7 and a headrest connecting structure 9. The cross member 7 is connected to the first lateral member 3 and the second lateral member 5 in a lower area of the seat back structure 1. The first lateral member 3 has a first lateral member connection 11. The second lateral member 5 has a second lateral member connection 13. The first lateral member connection 11 and the second lateral member connection 13 connect the seat back structure 1 to a seat cushion (not shown) such that the seat back structure 1 is movable about axis 15. The first lateral member 3, the second lateral member 5, the cross member 7 and the headrest connecting structure 9 may be made of steel or any other suitable material.

Figure 2:
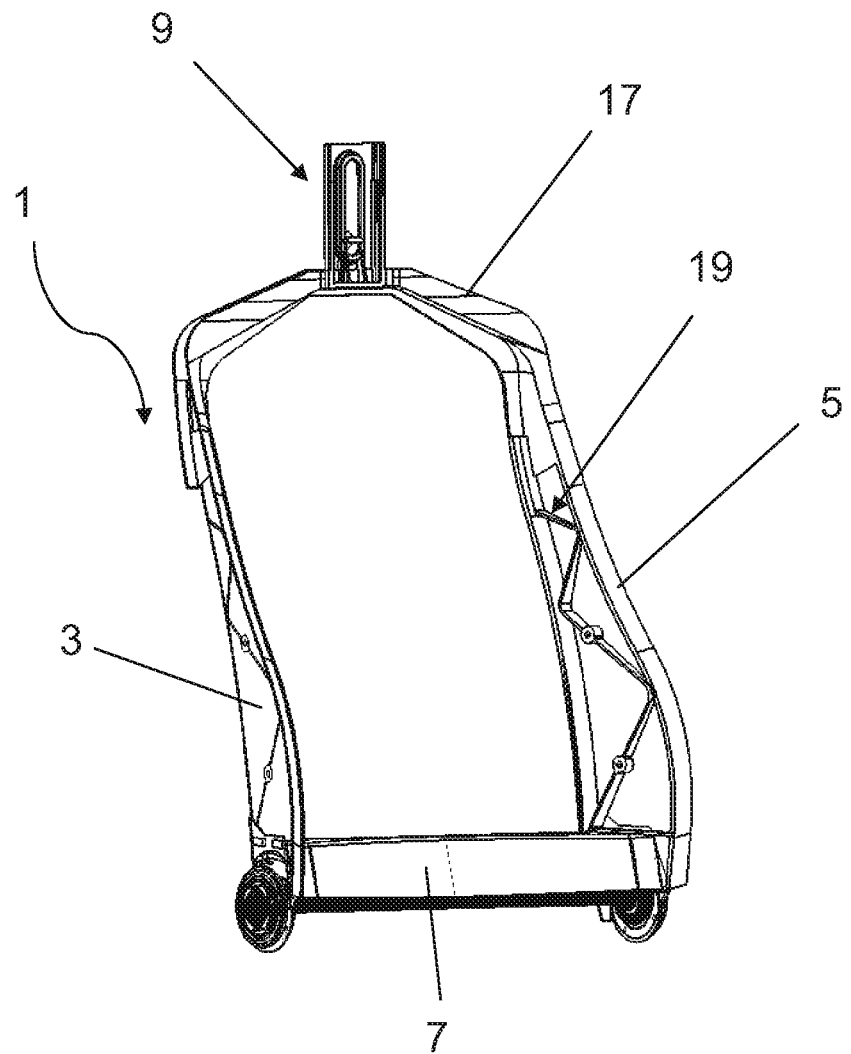
FIG. 2 is a perspective view of the seat back structure after the overmolding process is completed.

FIG. 2 is a perspective view of the seat back structure 1 after the overmolding process has been completed. The seat back structure 1 includes an overmolded member 17. The overmolded member 17 is produced during the overmolding process. The overmolded member 17 is connected to the headrest connecting structure 9, the first lateral member 3 and the second lateral member 5. The overmolded structure 17 may be formed of a material that is different from the material of the first lateral member 3, the second lateral member 5, the cross member 7 and the headrest connecting structure 9. The overmolded member 17 defines an upper portion of the seat back structure 1. Material provided during the overmolding process may be applied to the components of the seat back structure 1 to reinforce the components of the seat back structure. The second lateral member 5 includes overmolded material 19, which reinforces the structure of the second lateral member 5. The overmolded material 19 may also be applied to one or more of the first lateral member 3, the headrest connecting structure 9 and the cross member 7 to reinforce one or more of the first lateral member 3, the headrest connecting structure 9 and the cross member 7.

Figure 3:
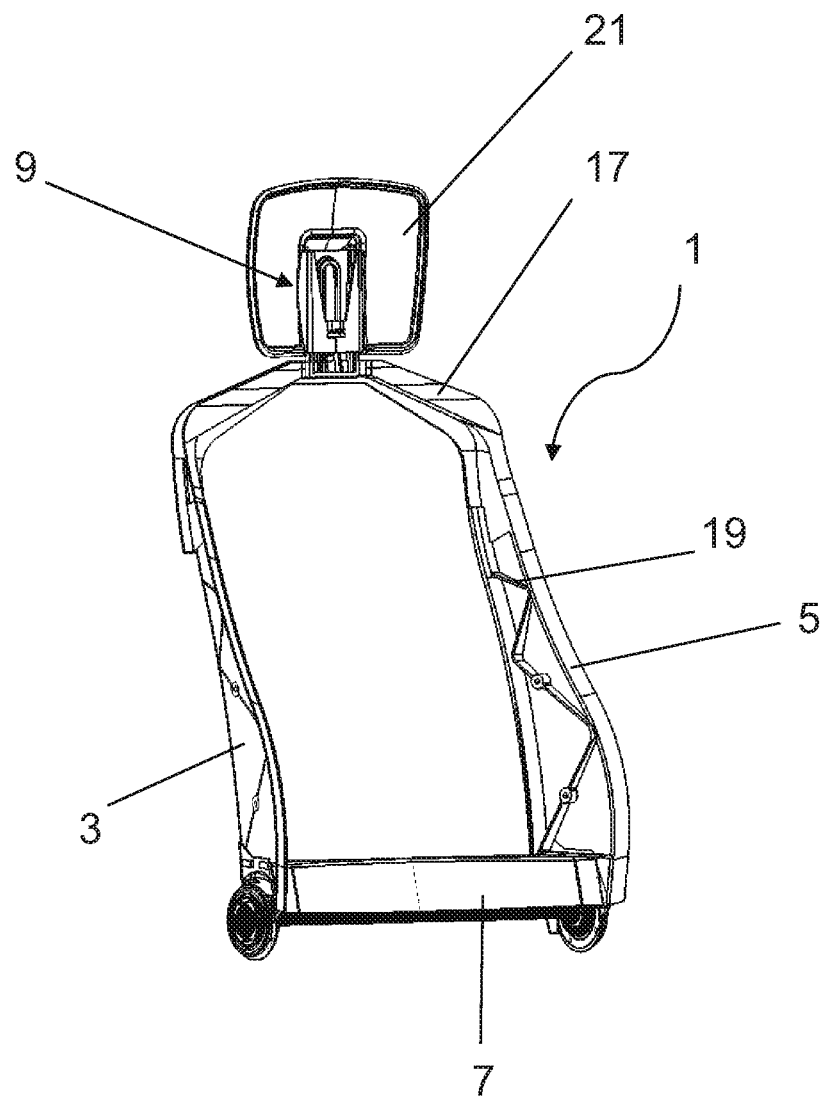
FIG. 3 is another perspective view of the seat back structure after the overmolding process is completed.

FIG. 3 shows the seat back structure 1 after the overmolding process has been completed. A headrest structure 21 is connected to the headrest connecting structure 9, which connects the headrest structure 21 to the seat back structure 1.

Figure 4A:
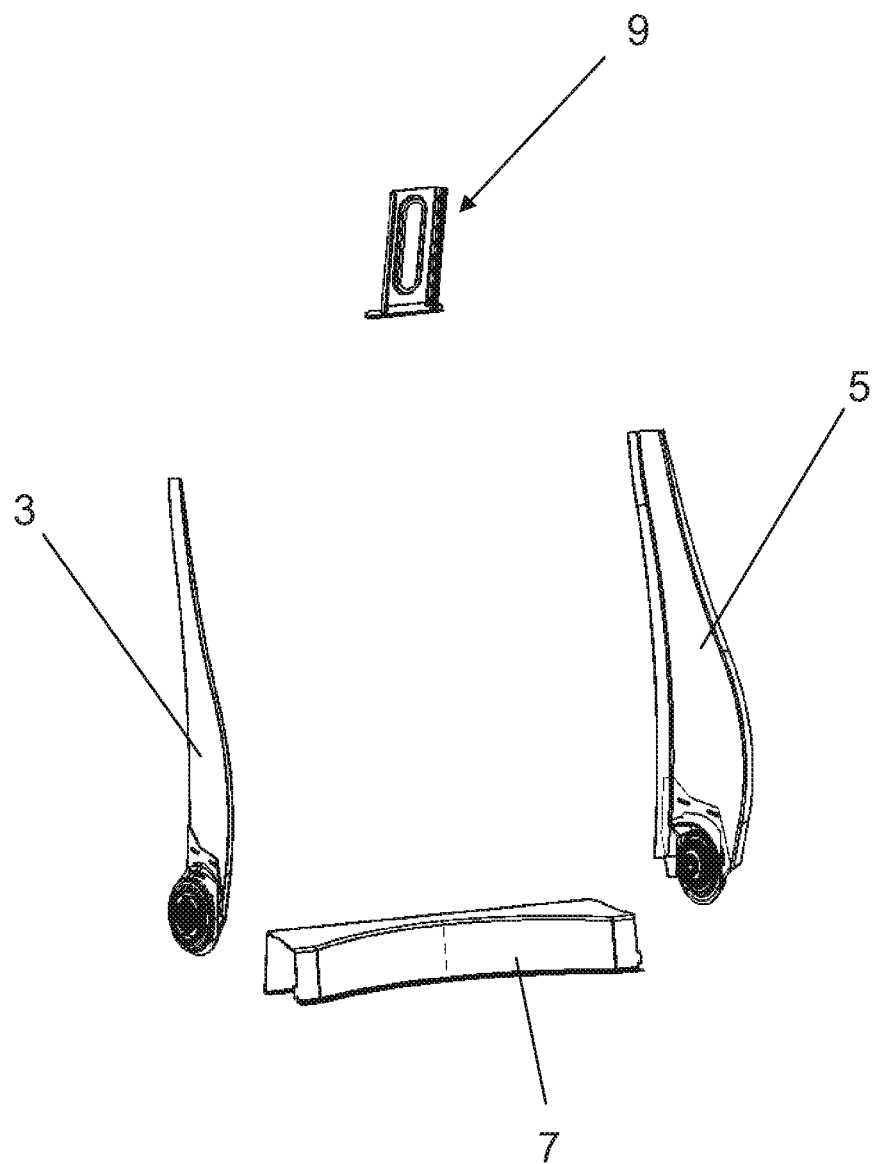
FIG. 4a is a perspective view of components of the seat back structure before the overmolding process is started.
Figure 4B:
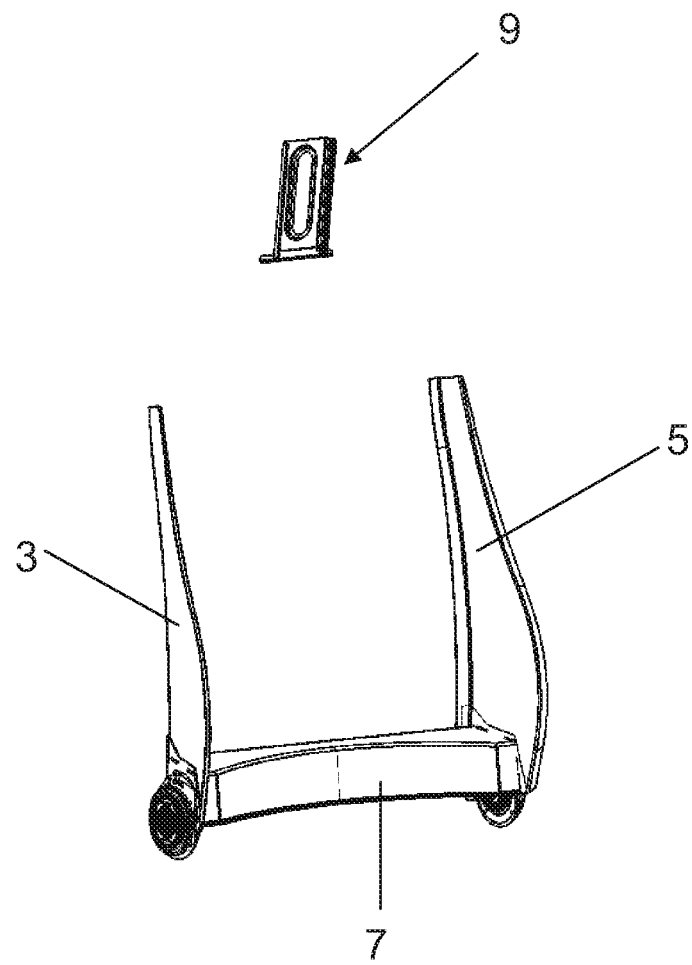
FIG. 4b is a perspective view of the components of the seat back structure before the overmolding process is completed.
Figure 4C:
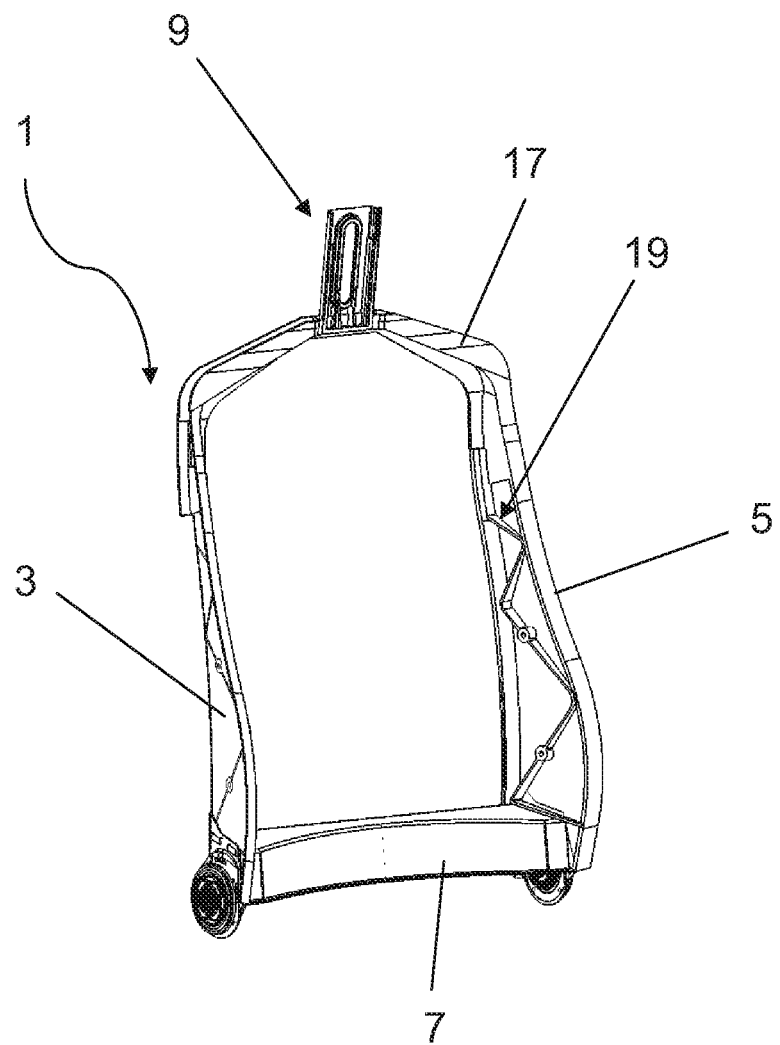
FIG. 4c is a perspective view after the overmolding process is completed to form the seat back structure.

FIGS. 4a, 4b and 4c show various steps of an overmolding process. FIG. 4a shows the first lateral member 3, the second lateral member 5, the cross member 7 and the headrest connecting structure 9 located at a spaced location from each other. In FIG. 4b, the cross member 7 is connected to the first lateral member 3 and the second lateral member 5. The cross member 7 may be connected to the first lateral member 3 and the second lateral member 5 by mechanical interlocks, welding or any other suitable means for connecting the parts together, this could include the overmolding process itself. In FIG. 4c, an overmolding process is completed to form the seat back structure 1. During the overmolding process, the overmolded member 17 is formed. The overmolded member 17 forms an upper portion of the seat back structure 1. The overmolded member 17 is integrally connected to the headrest connecting structure 9 or integrated headrest structure, the first lateral member 3 and the second lateral member 5 so that the seat back structure 1 is formed in a single piece.

Figure 5:
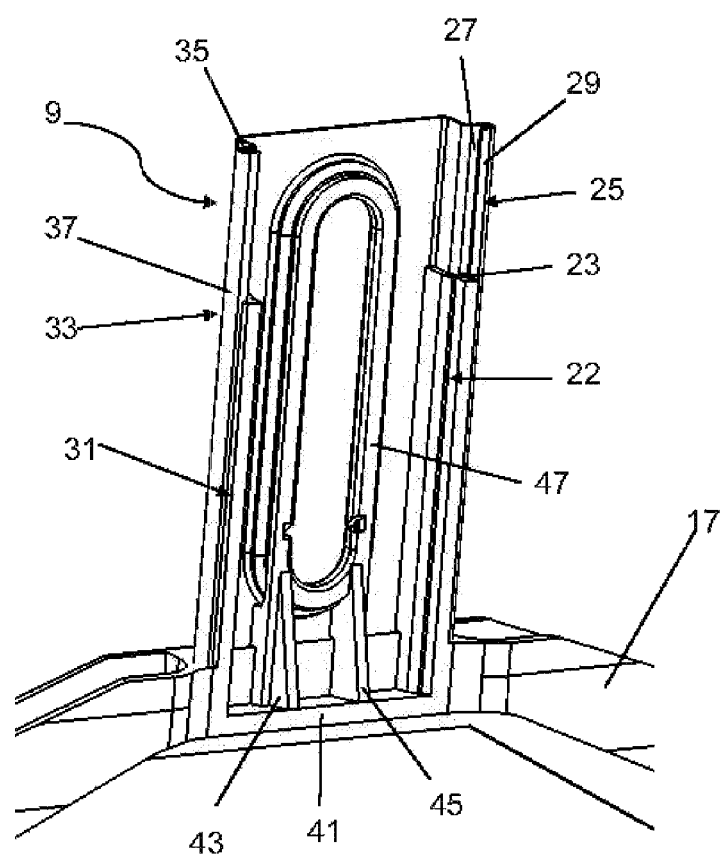
FIG. 5 is an enlarged view of the headrest connecting structure of the seat back structure.

FIG. 5 is an enlarged view of the headrest connecting structure 9 of the seat back structure. The headrest connecting structure 9 has a first primary extending portion 25. The overmolded member 17 has a first extending portion 22 that includes a projection 23. The first extending portion 22, which may be formed of molded composite, reinforces a sliding surface 29. The projection 23 may be molded into a slot 27 of the second extending portion 25. The first extending portion 22 is integrated with the seat back structure 1. The sliding surface 29 may be formed of steel. The sliding surface 29 defines a male connector of a male-female connection that connects the headrest structure 21 to the seat back structure 1. The headrest connecting structure 9 has a third extending portion 31 and a fourth extending portion 33. The third extending portion 31 has a projection (not shown) that is molded into a slot 35 of the fourth extending portion 33. The fourth extending portion 33 has a projecting surface 37 that is inserted into another slot of the headrest 21 to define another male-female connection that connects the headrest structure 21 to the seat back structure 1. The projecting surface 37 defines a male connector of the another male-female connection to connect the headrest structure 21 to the seat back structure 1. The headrest connecting structure 9 includes a base portion 41 that is part of the overmolded member 17. The headrest connecting structure 9 also includes a first supporting portion 43 and a second supporting portion 45 and an annular extending portion 47. The first supporting portion 43 and the second supporting portion 45 are connected to the annular extending portion 47 and the base portion 41.

Figure 6:
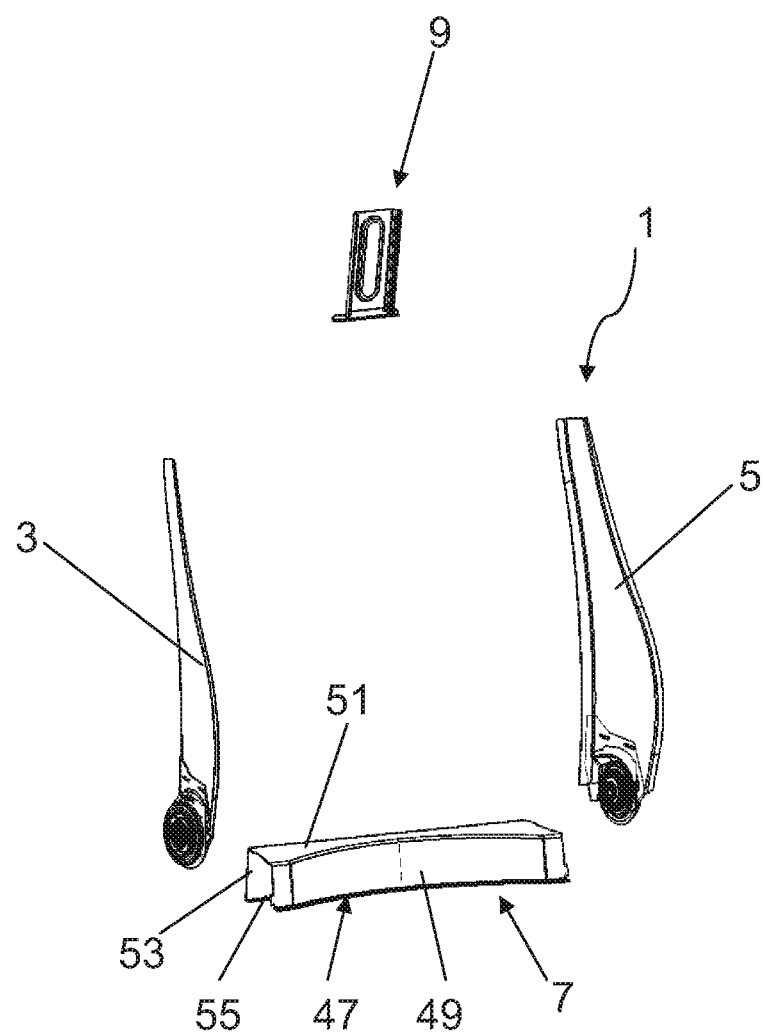
FIG. 6 is another perspective view of the seat back structure prior to the overmolding process taking place.

FIG. 6 shows the seat back structure 1 prior to the overmolding process with the first lateral member 3, the second lateral member 5, the cross member 7 and the headrest connecting 9 located at spaced locations from each other. The cross member 7 has a first cross member portion 47. The first cross member portion 47 has an arcuate portion 49. In another embodiment, instead of having an arcuate portion, the first cross member portion 47 may be completely straight. The cross member 7 has a second cross member portion 51 and a third cross member portion 53. The first cross member portion 47, the second cross member portion 51 and the third cross member portion 53 define an opening 55 that faces in a direction away from the headrest connecting structure 9 in a direction of a vehicle floor (not shown) to define an inverted cross member structure. The inverted cross member structure aids in carrying a moment from the first lateral member 3 and/or the second lateral member 5 to stabilize the first lateral member 3 and/or the second lateral member 5. Ends of cross member 7 have an interlocking feature to engage with side member 3.

Figure 7:
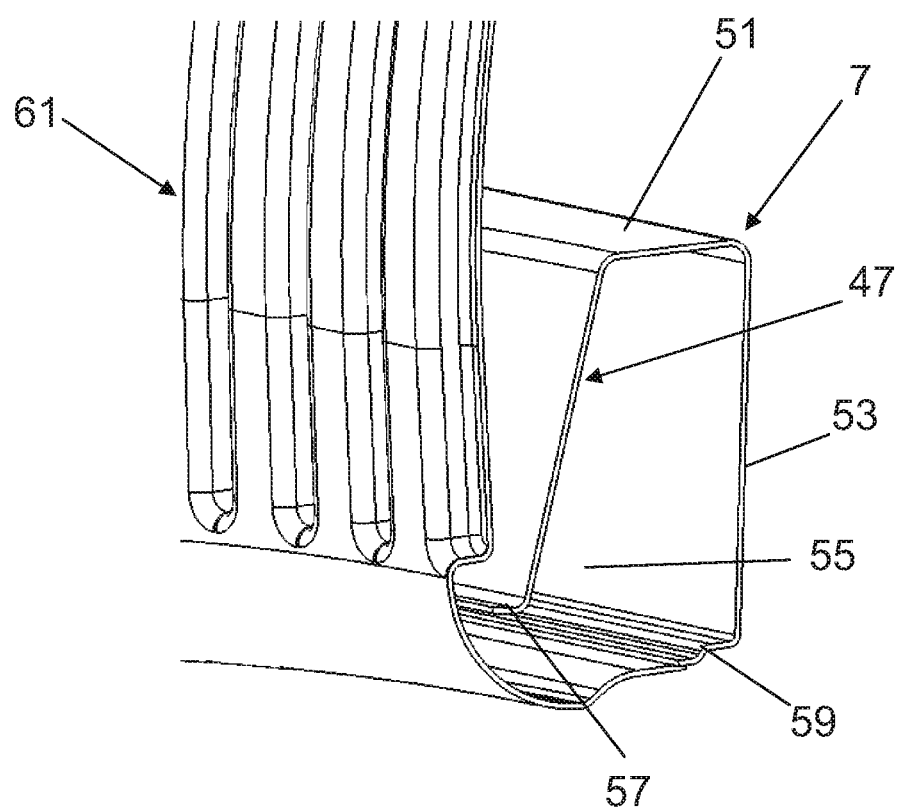
FIG. 7 is an enlarged view of seat back structure in the area of the cross member.

FIG. 7 is an enlarged view of seat back structure 1 in the area of the cross member 7. The first cross member portion 47 has a bent portion 57. The third cross member portion 53 has a bent portion 59. A supporting panel 61 is connected to the cross member 7. The supporting panel 61 may be connected to the bent portion 59 of the third cross member portion 53. The supporting panel 61 may be bonded or mechanically affixed to an overmold section on the bent portion 59 of the third cross member portion 53. The supporting panel 61 has corrugations 63. To allow the corrugations 63 to deflect when the seat back structure 1 is occupied by a user, the supporting panel 61 is formed of a material that has a modulus of elasticity that allows the corrugations 63 to deflect to provide a sink in feel when the user occupies the seat back structure 1. The supporting panel 61 may be a single, one-piece panel and may be formed of thermoplastic elastomer (TPE), thermoplastic polyurethane (TPU) or of any form of polymer. The type of material of the supporting panel 61 is provided for energy management during a crash impact such as a head of the user impacting the seat back structure 1.

Figure 8:
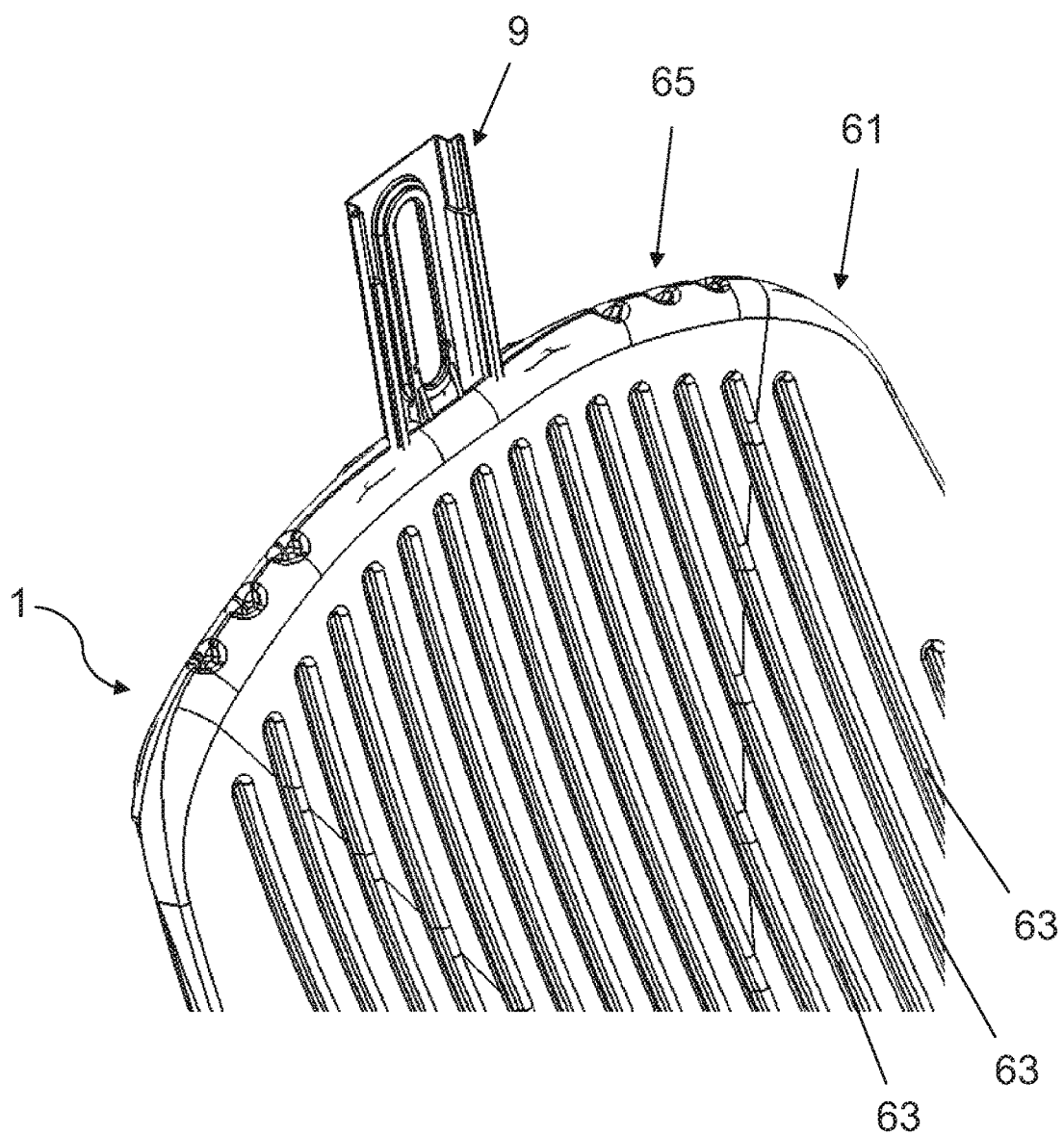
FIG. 8 is a partial perspective view of the seat back structure.

FIG. 8 shows an egg crate type attachment 65 that is used to attach the supporting panel 61 to the seat back structure 1. Instead of the egg crate type attachment 65, any shape that can absorb energy and be formed of the supporting panel 61 can be used to connect the supporting panel 61 to the seat back structure 1. All known means of attachment can be used to connect the supporting panel 61 to the seat back structure 1, such as bolting, bonding, welding, mechanical snap fit connection and riveting.

Figure 9:
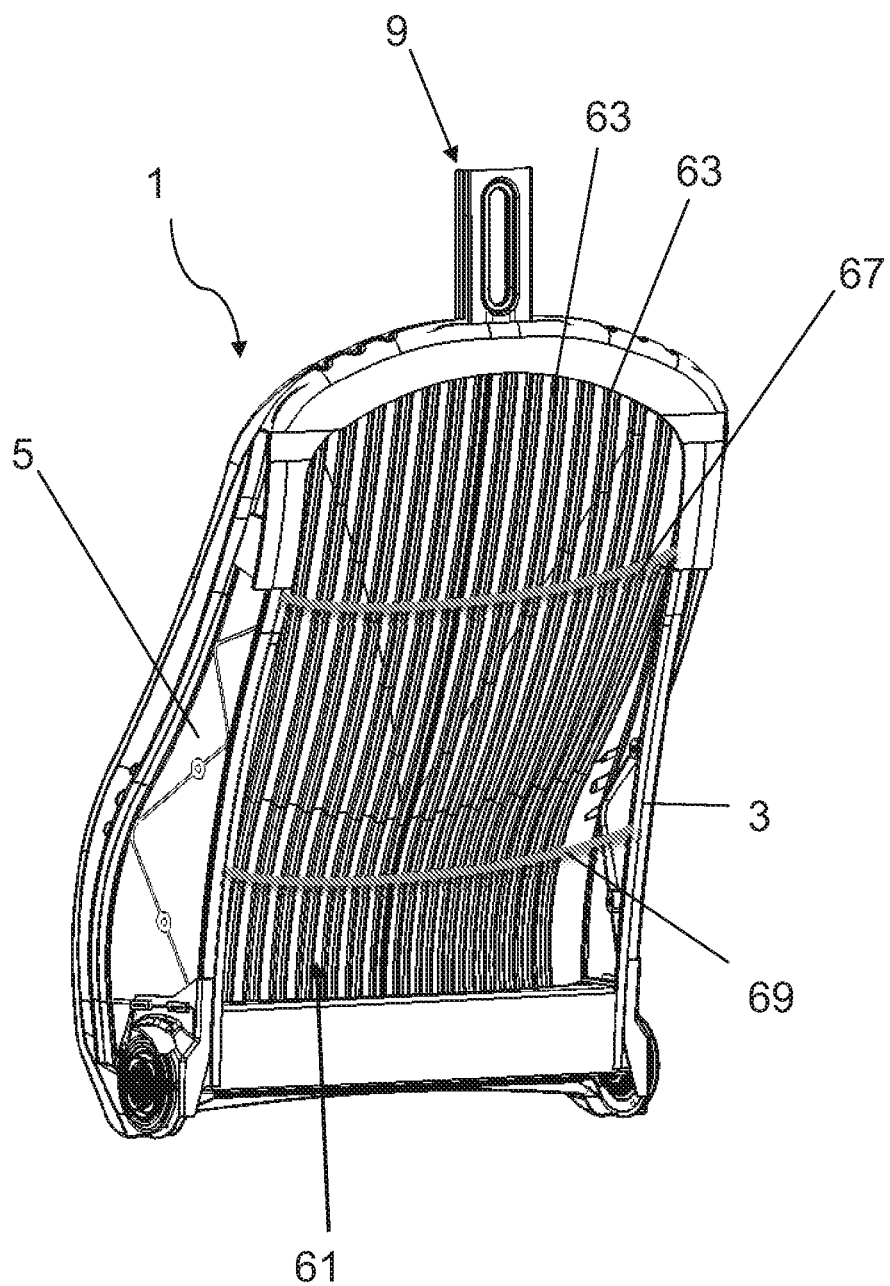
FIG. 9 is a rear perspective view of the seat back structure 1 after the overmolding process is completed.
Figure 10:
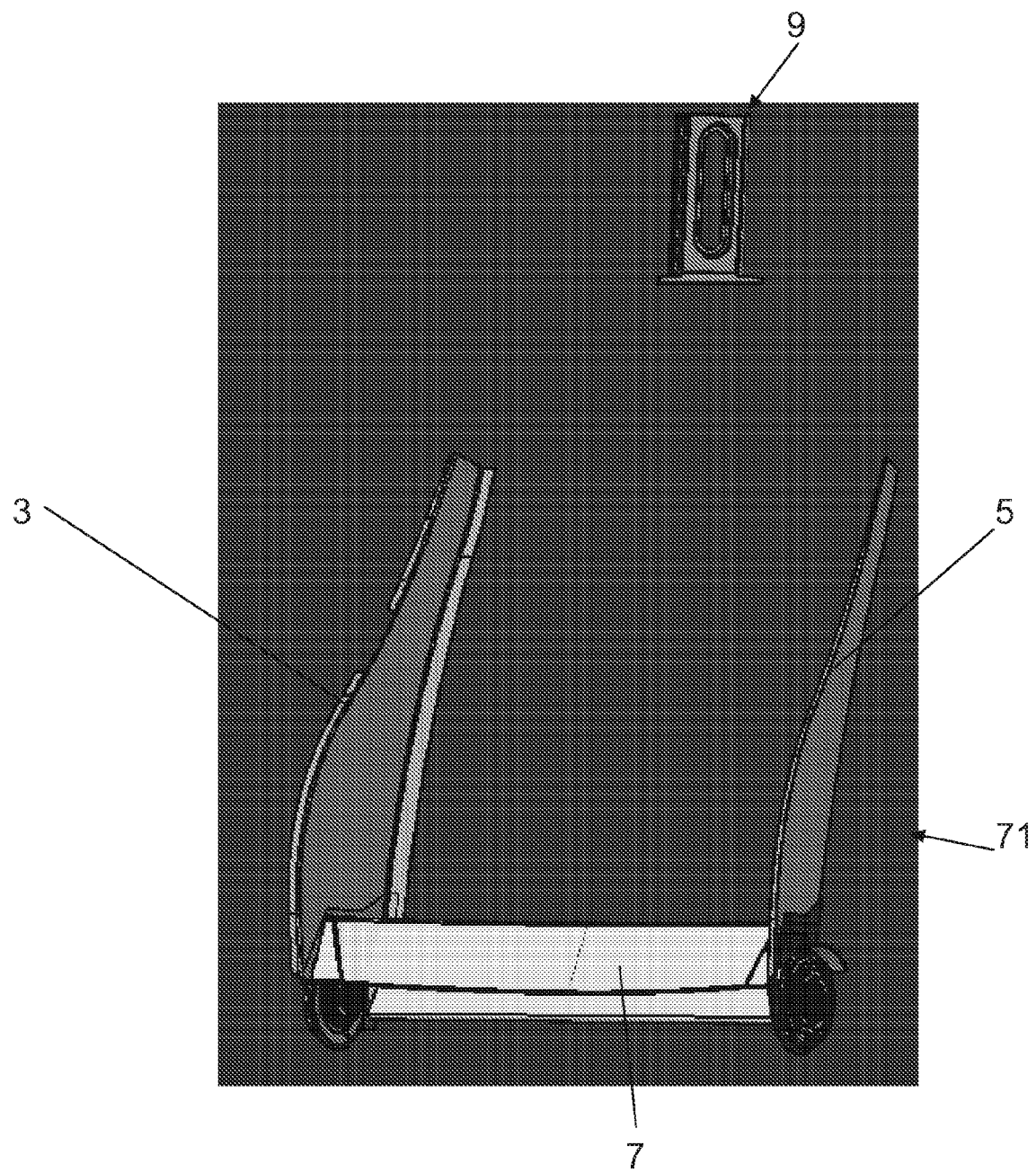
FIG. 10 is a perspective view of components of the seat back structure prior to the overmolding process taking place.

FIG. 9 shows a rear perspective view of the seat back structure 1 after the overmolding process has been completed and with the supporting panel 61 connected to the seat back structure 1. Due to the corrugations 63 there is a high degree of potential displacement of the supporting panel 61. To manage loads in a crash, a first strap 67 and a second strap 69 are connected to the first lateral member 3 and the second lateral member 5. The first strap 67 may be parallel to the second strap 69. In another embodiment, only one of the first strap 67 and the second strap 69 may be used or in another embodiment several straps may be used. The first strap 67 and the second strap 69 are made of ductile material to absorb energy. The amount of deflection of the supporting panel 61 can be controlled based on the tension in the first strap 67 and the second strap 69 can be adjusted FIG. 10 shows the first later member 3, the second lateral member 5, the cross member 7 and the headrest connecting structure 9 arranged in a mold tool 71 prior to the overmolding process taking place.

Figure 11:
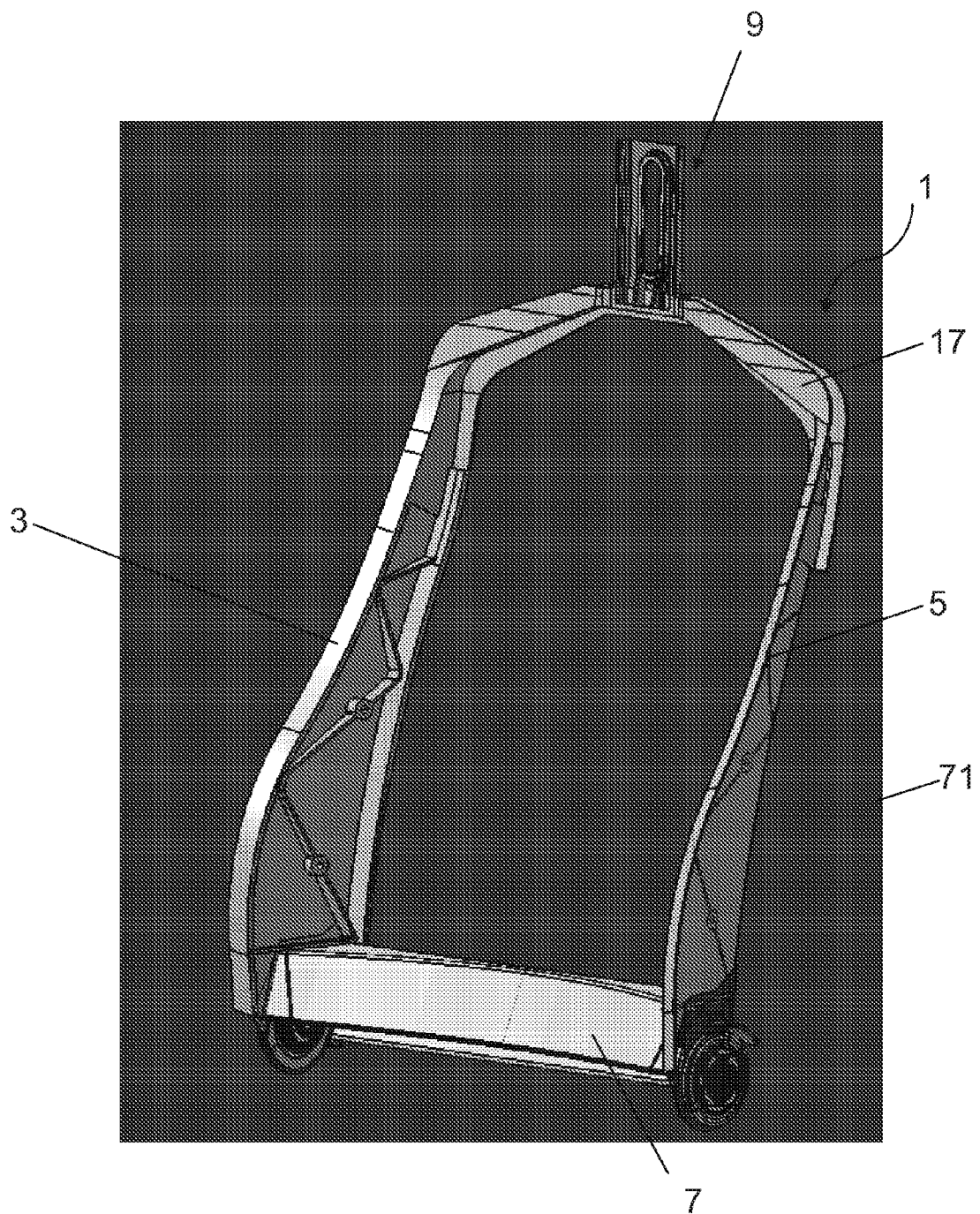
FIG. 11 is a perspective view of the seat back structure that is formed after the overmolding process is completed.

FIG. 11 shows the seat back structure 1 in the mold tool 71 after the overmolding process has taken place to form the overmolded portion 17. The inverted cross member 7 enables a molding die to open at the bottom to allow molding material to enter the mold tool 71.

Figure 12:
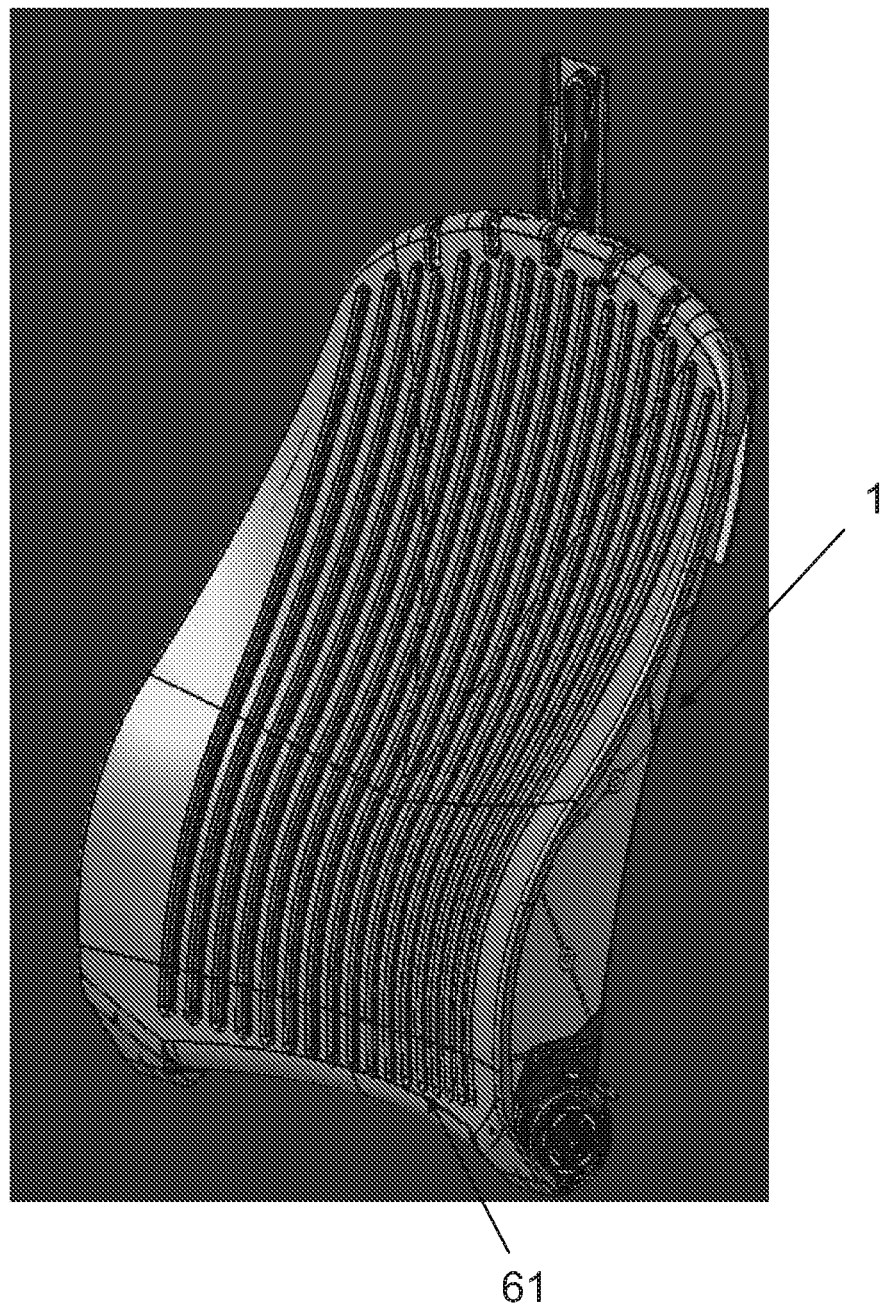
FIG. 12 is a perspective view of the seat back structure that is formed after the overmolding process is completed.

FIG. 12 shows a perspective view of the seat back structure 1 after the overmolding process has been completed with the supporting panel 61 being connected to the seat back structure 1. The supporting panel 61 may be formed of any polymer, but preferably a thermoplastic elastomer. The supporting panel 61 may be heat staked to the seat back structure 1 to connect the supporting panel 61 to the seat back structure 1. In another embodiment, the supporting panel 61 may be adhered or fastened to the seat back structure 1. In another embodiment, the overmold would create a connection (mating) means for retaining the connection (mating) means of the supporting panel 61.

Figure 13:
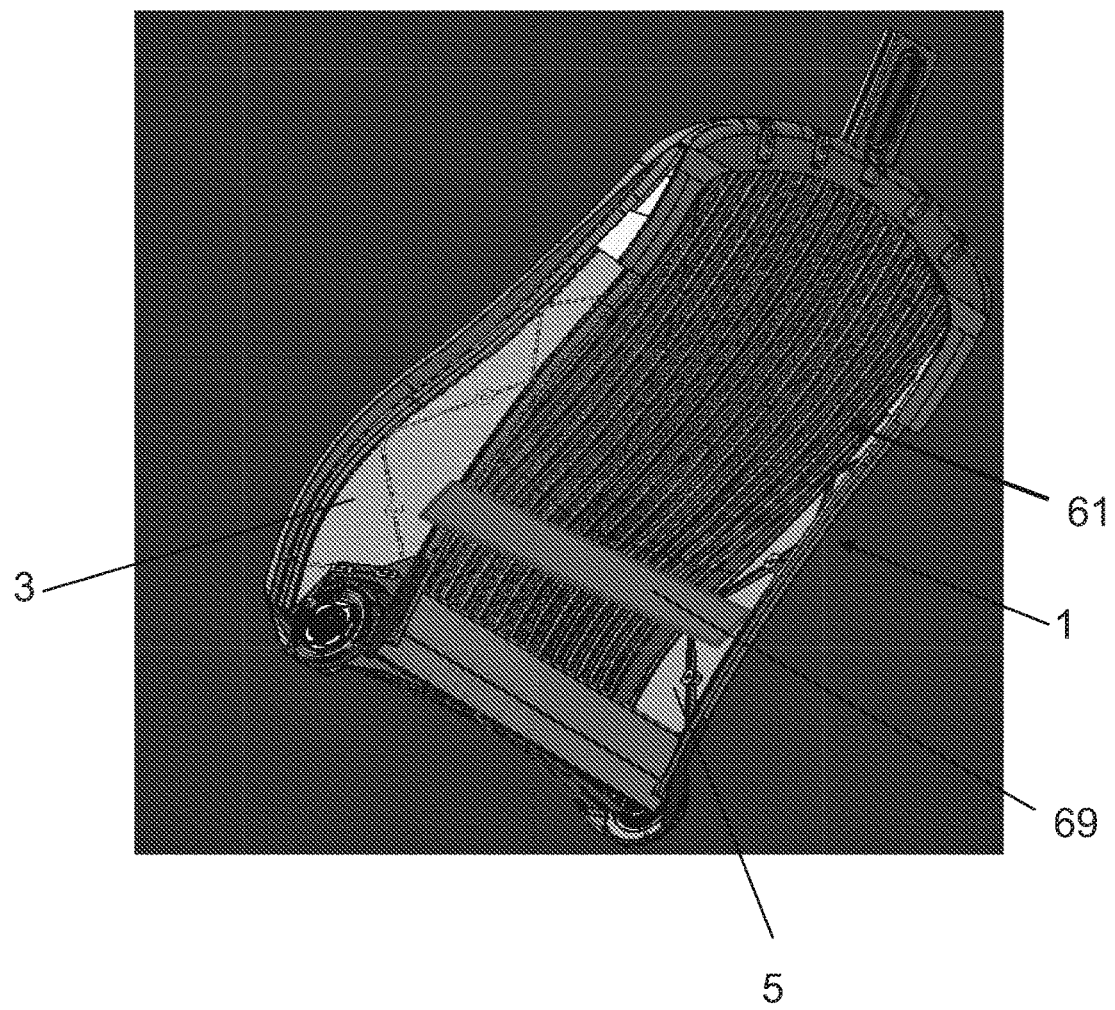
FIG. 13 is another rear perspective view of the seat back structure that is formed after the overmolding molding process is completed.

FIG. 13 shows another rear perspective view of the seat back structure 1 after the overmolding molding process has been completed and the supporting panel 61 connected to the seat back structure 1. FIG. 13 shows an embodiment in which only the second strap 69 is connected to the first lateral member 3 and the second lateral member 5.

Figure 14:
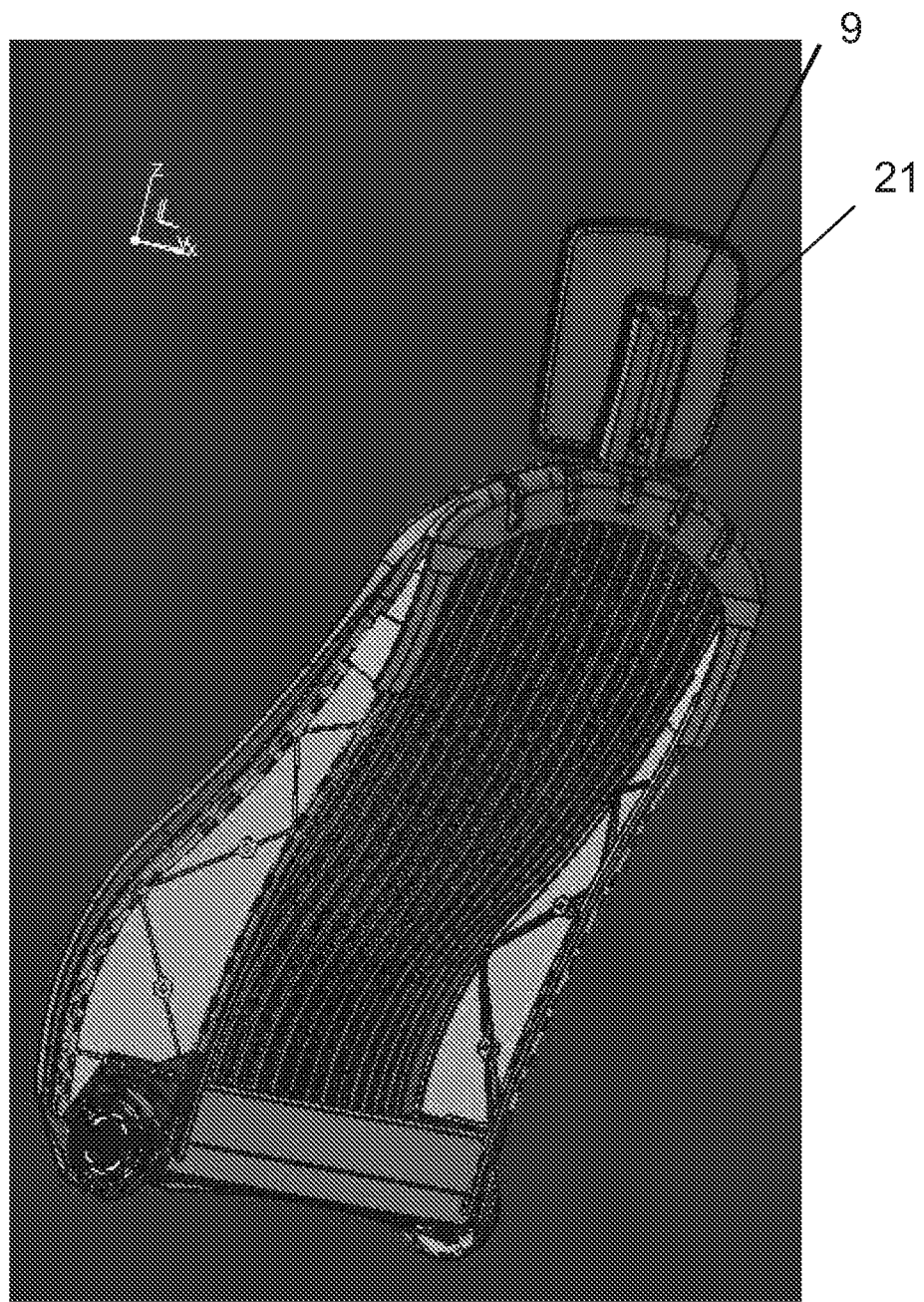
FIG. 14 is another rear perspective view of the seat back structure.

FIG. 14 shows another rear perspective view of the seat back structure 1 after the overmolding molding process has been completed and the supporting panel 61 connected to the seat back structure 1. The headrest structure 21 is connected to the headrest connecting structure 9. The headrest structure 21 is connected to the headrest connecting structure 9 by sliding the headrest structure 21 onto to the headrest connecting structure 9. The headrest structure 21 locks to the headrest connecting structure 9. The headrest connecting structure 9 forms a protruded male portion of a male to female connection for connecting the headrest structure 21 to the seat back structure 1.

Figure 15:
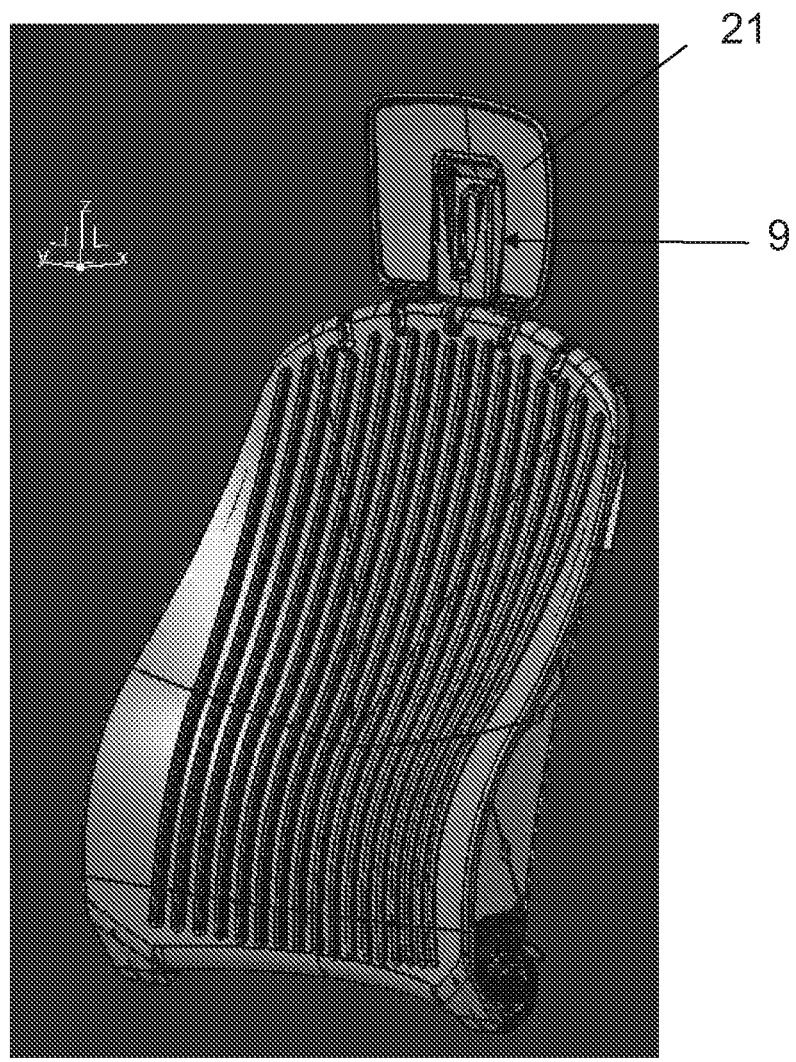
FIG. 15 is a front perspective view of the seat back structure.

FIG. 15 shows a front perspective view of the seat back structure 1 after the overmolding molding process has been completed and the supporting panel 61 connected to the seat back structure 1. The headrest structure 21 slides on the headrest connecting structure 9 until the headrest structure 21 stops on the overmolded member 17.

Figure 16:
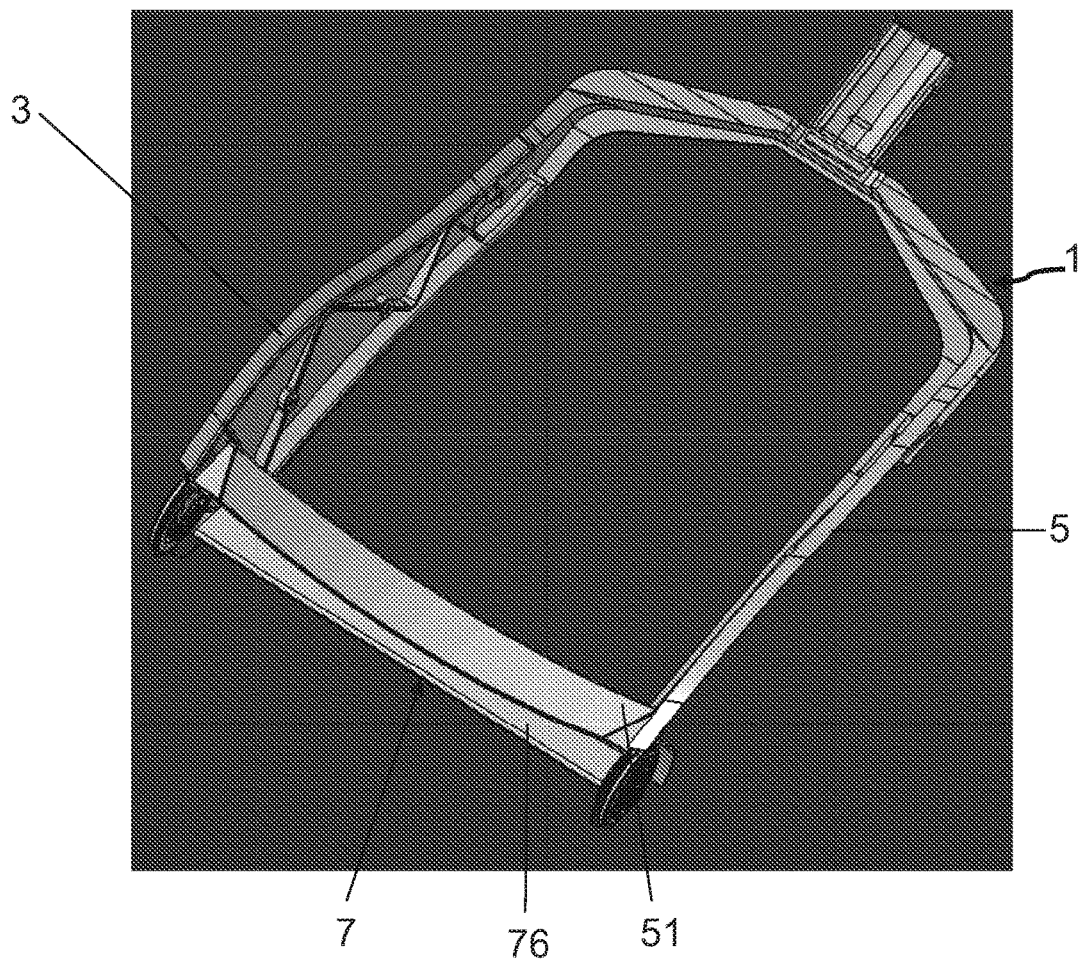
FIG. 16 is another perspective view of the seat back structure after the overmolding molding process is completed.

FIG. 16 shows a perspective view of the seat back structure 1 after the overmolding molding process has been completed. A polymer panel 76 is wrapped around the bottom of the seat back structure 1 to create closeout. This allows the cross member 7 to be flipped upside down. This works well with overmolding because it allows the mold tool 71 to close on the cross member 7 and create supporting ribs (not shown). A configuration of the ribs aids in lateral loading that comes into play as a result of compression of the seat back structure 1 during a side impact, which may occur during a vehicular accident. Further, having the section 51 of the cross member 7 at the top stabilizes the first lateral member 3 and/or the second lateral member 5 from a torsional component during impact of a vehicular crash.

Figure 17:
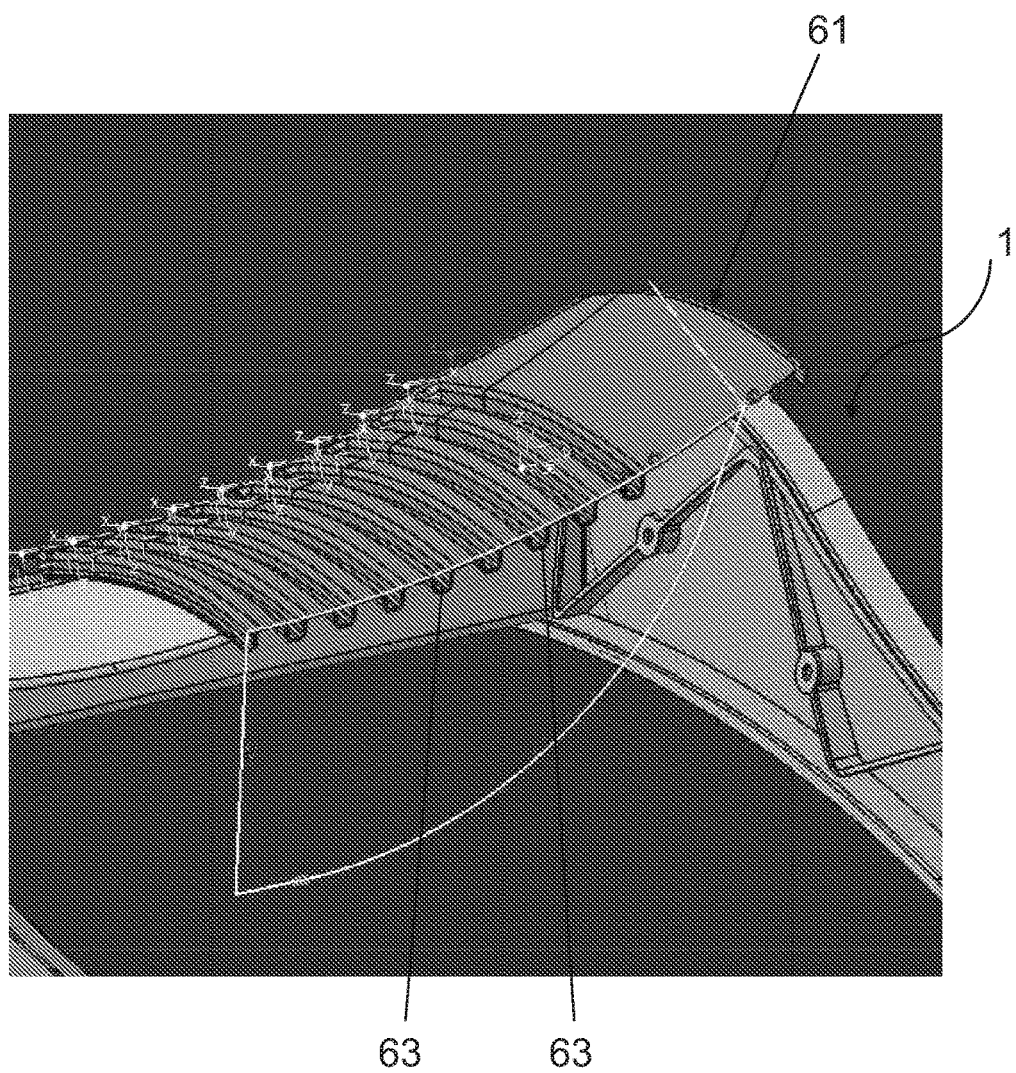
FIG. 17 is a partial view of the seat back structure that is formed via the overmolding process.

FIG. 17 shows a partial view of the supporting panel 61 connected to the seat back structure 1 after the seat back structure 1 has been formed via an overmolding process. Due to the depth potential of the corrugations 63 and the supporting panel 61 being suspended across the seat back structure 1, a user is allowed to sink in to the supporting panel 61. The material of the supporting panel 61 itself or a secondary/tertiary member can create ideal impact sink in during a vehicular crash so that the user is protected from whiplash during the crash while limiting a load imparted on the rest of the seat back structure 1. The connection of the supporting panel 61 to the seat back structure 1 allows deflection energy to be absorbed during a vehicular crash, particularly in an integrated head impact zone for the user.

While specific embodiments of the invention have been shown and described in detail to illustrate the application of the principles of the invention, it will be understood that the invention may be embodied otherwise without departing from such principles.

What is claimed is:

1. A process, comprising:
    forming a connecting surface for a supporting panel via an overmolding process;
    providing a first side member, a second side member, a lower cross member and an upwardly projecting slide configured for supporting a headrest;
    assembling and interconnecting said first side member, said second side member, said lower cross member and said headrest sliding surface via an overmolding material in said overmolding process to form a seat back structure, said seat back structure comprising said connecting surface;
    wherein said overmolding process forms an overmolded seat back structure, said overmolded seat back structure comprising said upwardly projecting slide, and wherein said upwardly projecting slide is formed of a material different from the overmolding material.

2. A process in accordance with claim 1, further comprising:
    providing an inverted lower cross member, said inverted lower cross member defining at least a portion of said connecting surface.

3. A process in accordance with claim 1, wherein one or more of said first side member, said second side member, said lower cross member and said headrest sliding surface are reinforced with overmold via said overmolding process.

4. A process in accordance with claim 1, further comprising:
    providing a strap;
    connecting said strap to said support panel.

5. A process in accordance with claim 1, wherein said supporting panel is formed in one piece, said one piece supporting panel being connected to said overmolded seat back structure.

6. A process, comprising:
    providing a plurality of separate seat back elements;
    connecting said plurality of seat back elements via an overmolding material in an overmolding process to form a seat back structure, said seat back structure comprising a connecting means for connecting a support panel;
    wherein said plurality of seat back elements comprise a headrest slide structure formed of a different material than the overmolding material, said headrest slide structure being integrally connected to said overmolded seat back member to form said seat back structure by said overmolding process with an integrally connected headrest slide structure, said headrest slide structure comprising a projection to define a male connection portion configured for slidably supporting a headrest.

7. A process in accordance with claim 6, wherein said plurality of seat back elements comprises a first member, a second member and a cross member, wherein an overmolded seat back member is formed via said overmolding process, said first member being connected to said second member via said overmolded member.

8. A process in accordance with claim 6, wherein said overmolded seat back member is formed of a material that is different from a material of said first member, said second member and said cross member.

9. A process in accordance with claim 7, wherein said cross member comprises a first cross member portion, a second cross member portion and a third cross member portion, said first cross member portion being connected to said second cross member portion via said third cross member portion, said first cross member portion and said second cross member portion extending in a direction of a floor of a vehicle, said first cross member portion, said second cross member portion and said third cross member portion defining an opening facing in a direction of the floor of the vehicle to define an inverted cross member structure.

10. A process in accordance with claim 7, wherein one or more of said first member, said second member, said cross member and said overmolded seat back member are reinforced with said overmolded material via said overmolding process.

11. A process in accordance with claim 6, further comprising:
    a strap connected to said seat back structure.

12. A process in accordance with claim 6, wherein said support panel is a one-piece support panel, said one-piece support panel being connected to said seat back structure.

13. A seat comprising:
    an overmolded seat back structure comprising an interfacing surface for supporting a support panel;
    wherein said overmolded seat back structure comprises a first lateral member, a second lateral member, an overmolded member of an overmolding material and a cross member, said first lateral member being connected to said second lateral member via said overmolded member; and
    wherein said overmolded seat back structure comprises a slide element, said slide element formed of a material different from the overmolding material and being integrally connected to said overmolded member to define a single seat back structure with an integrally connected slide configured for supporting a headrest, said slide element comprising an upwardly projecting slide surface for connection with the headrest, wherein overmolded material engages and interconnects said slide element with one or more of said first lateral member, said second lateral member and said cross member to define one or more overmolded reinforced seat back parts.

14. A seat in accordance with claim 13, wherein the interfacing surface defines a mechanical interface to attach said support panel.

15. A seat in accordance with claim 13, wherein the interfacing surface defines one of a bonding interface and a thermobonding interface to attach said support panel.

16. A seat in accordance with claim 13, further comprising:
    a strap connected to said overmolded seat back structure.

* * * * *